US 9,356,286 B1

United States Patent
Kitagawa et al.

(10) Patent No.: US 9,356,286 B1
(45) Date of Patent: May 31, 2016

(54) ELECTRODE MATERIAL, PASTE FOR ELECTRODES, AND LITHIUM ION BATTERY

(71) Applicant: SUMITOMO OSAKA CEMENT CO., LTD., Tokyo (JP)

(72) Inventors: Takao Kitagawa, Furnabashi (JP); Kenta Ooishi, Funabashi (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 14/696,744

(22) Filed: Apr. 27, 2015

(30) Foreign Application Priority Data

Nov. 27, 2014 (JP) .................. 2014-240201

(51) Int. Cl.
| | |
|---|---|
| H01M 4/587 | (2010.01) |
| H01M 4/583 | (2010.01) |
| H01M 4/36 | (2006.01) |
| H01M 4/131 | (2010.01) |
| H01M 4/525 | (2010.01) |
| H01M 4/505 | (2010.01) |
| H01M 10/0525 | (2010.01) |
| H01M 4/58 | (2010.01) |
| H01M 4/133 | (2010.01) |
| H01M 4/02 | (2006.01) |

(52) U.S. Cl.
CPC .............. *H01M 4/366* (2013.01); *H01M 4/131* (2013.01); *H01M 4/133* (2013.01); *H01M 4/505* (2013.01); *H01M 4/525* (2013.01); *H01M 4/587* (2013.01); *H01M 4/5825* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2011/0027651 A1* | 2/2011 | Sun et al. | ....... 429/220 |
| 2015/0255787 A1 | 9/2015 | Mine et al. | |

FOREIGN PATENT DOCUMENTS

| | | |
|---|---|---|
| JP | 2001015111 A | 1/2001 |
| JP | 2004-207252 A | 7/2004 |

(Continued)

OTHER PUBLICATIONS

Chen et al, Reducing Carbon in LiFePO4/C Composite Electrode to Maximize Specific Energy, Volumetric Energy, and Tap Density, 149(9) J. Electrochem. Soc. A1184-89 (2002)).*

(Continued)

*Primary Examiner* — Yoshitoshi Takeuchi
(74) *Attorney, Agent, or Firm* — Fitch, Even, Tabin & Flannery, LLP

(57) ABSTRACT

An electrode material in which an electrode active material having a carbonaceous film formed on the surface is used, a migration path through which lithium ions diffuse is maintained in the carbonaceous film, and the lithium ion conductivity is also improved while the electron conductivity is supported by the carbonaceous film is provided.

A electrode material, wherein the electrode material have a particulate shape, the electrode material is formed a carbonaceous film on surfaces of electrode active material particles, a coating proportion of the surfaces of the electrode active material particles by the carbonaceous film is 80% or more, and an apparent density (ρV) of the carbonaceous film calculated from an amount of carbon in the electrode material, a specific surface area of the electrode material, and an average film thickness of the carbonaceous film is in a range of 0.10 g/cm³ to 1.08 g/cm³.

19 Claims, 1 Drawing Sheet

(56) References Cited

FOREIGN PATENT DOCUMENTS

| JP | WO 2013/146168 | * 10/2013 | ............. H01M 4/58 |
|---|---|---|---|
| WO | 2013/146168 | 10/2013 | |
| WO | 2013/146168 A1 | 10/2013 | |
| WO | 2014/185494 A1 | 11/2014 | |

OTHER PUBLICATIONS

Webb, Volume and Density Determinations for Particle Technologists (2001).*

Pavlov, Lead-Acid Batteries Science and Technology, Elsevier (2011).*

Search Report of EP Appln. No. 15001208.6 dated Aug. 17, 2015 in English.

Kim et al., A Modified Mechanical Activation Synthesis for Carbon-Coated LiFePO4 Cathode in Lithium Batteries, Science Direct, Materials Letters 61, 2007, pp. 3822-3825.

JP Office Action of Appln. No. 2014-240201 dated Apr. 14, 2015.

* cited by examiner

ELECTRODE MATERIAL, PASTE FOR ELECTRODES, AND LITHIUM ION BATTERY

TECHNICAL FIELD

The present invention relates to an electrode material, paste for electrodes, and a lithium ion battery.

BACKGROUND ART

In recent years, as a battery anticipated to have a small size, a light weight, and high capacity, a non-aqueous electrolytic solution-based secondary battery such as a lithium ion battery has been proposed and put into practical use. The lithium ion battery is configured to have a positive electrode and a negative electrode which have properties capable of reversibly intercalating and deintercalating lithium ions, and a non-aqueous electrolyte.

As a negative electrode active material for negative electrode materials of the lithium ion battery, a lithium-containing metal oxide such as lithium titanate ($Li_4Ti_5O_{12}$) or a carbon-based material is used.

On the other hand, as a positive electrode active material for positive electrode materials of the lithium ion battery, a lithium-containing metal oxide such as lithium cobaltate ($LiCoO_2$), a lithium oxoacid salt-based compound such as lithium iron phosphate ($LiFePO_4$), or the like is used. The positive electrode of the lithium ion battery can be formed by, for example, applying and drying paste for electrodes including a positive electrode active material, a binding agent, and the like on the surface of a metal foil called a collector.

Compared with secondary batteries of the related art such as lead batteries, nickel-cadmium batteries, and nickel-hydrogen batteries, the lithium ion batteries have a lighter weight, a smaller size, and higher energy. Therefore, the lithium ion batteries are used not only as small-size power supplies used in portable electronic devices such as mobile phones and notebook personal computers but also as large-size stationary emergency power supplies.

In addition, recently, studies have been underway regarding the use of lithium ion batteries as high-output power supplies for plug-in hybrid vehicles, hybrid vehicles, industrial device, electric power tools, and the like. Since batteries used as the above-described high-output power supplies are frequently used in applications that are expected to be used outdoors, the batteries are required to have high-speed charge and discharge characteristics not only at room temperature but also at a low temperature in a case in which the batteries are expected to be used in cold areas.

Among the electrode active materials, the lithium oxoacid salt-based compound (particularly, lithium iron phosphate) is attracting attention due to the excellent safety and the absence of problems with its resource and cost. However, the lithium oxoacid salt-based compound has a problem with low electron conductivity due to its crystal structure (olivine-type crystal structure).

Therefore, in order to increase the electron conductivity of an electrode material for which the lithium oxoacid salt-based compound is used as an electrode active material, means of Japanese Laid-open Patent Publication No. 2001-15111 has been proposed. In Japanese Laid-open Patent Publication No. 2001-15111, particle surfaces of an electrode active material made of lithium iron phosphate are covered with an organic compound that is a carbon source, then, the organic compound is carbonized so as to form a carbonaceous film on the surface of the electrode active material, and carbon in the carbonaceous film is made to act as an electron conductive substance.

RELATED ART DOCUMENT

Patent Document

[Patent Document 1] Japanese Laid-open Patent Publication No. 2001-15111

DISCLOSURE OF THE INVENTION

Problem that the Invention is to Solve

However, the carbonaceous film acts as a hindrance to the redox reaction of lithium ions, and also acts as a hindrance to the diffusion of lithium ions. In addition, in a case in which the apparent density of the carbonaceous film is high, the coating proportion by the carbonaceous film, the film thickness of the carbonaceous film, and the crystallinity of the carbonaceous film tend to increase, but the conductivity of lithium ions is impaired. In summary, the improvement of electron conductivity and the improvement of lithium ion conductivity have a trade-off relationship with each other. For example, in an electrode active material in which a carbonaceous film is supported, the electron conductivity improves, but the lithium ion conductivity is impaired and thus the sum of the battery internal resistances increases and the voltage significantly drops when high-speed discharge is carried out.

An object of the present invention is to provide an electrode material in which an electrode active material having a carbonaceous film formed on the surface is used, a migration path through which lithium ions diffuse is maintained in the carbonaceous film, and the lithium ion conductivity is also improved while the electron conductivity is supported by the carbonaceous film, paste for electrodes, and a lithium ion battery.

Means for Solving the Problem

To solve the above-described problems, the present invention provides the following inventions [1] to [6].

[1] An electrode material, in which the electrode material have a particulate shape, the electrode material is formed a carbonaceous film on surfaces of electrode active material particles, a coating proportion of the surfaces of the electrode active material particles by the carbonaceous film is 80% or more and an apparent density ($\rho V$) of the carbonaceous film calculated from an amount of carbon in the electrode material, a specific surface area of the electrode material, and an average film thickness of the carbonaceous film is in a range of 0.10 $g/cm^3$ to 1.08 $g/cm^3$.

[2] The electrode material according to [1], in which a proportion of a carbon component in a total mass of the electrode material is in a range of 0.6% by mass to 5.0% by mass, a true density ($\rho T$) of the carbonaceous film obtained using a gas-phase substitution method is in a range of 1.80 $g/cm^3$ to 2.50 $g/cm^3$, and a ratio ($\rho V/\rho T$) of the apparent density ($\rho V$) of the carbonaceous film to the true density of the carbonaceous film is in a range of 0.04 to 0.60.

[3] The electrode material according to [1] or [2], in which the proportion of the carbon component in a total mass of the carbonaceous film is 50% by mass or more.

[4] The electrode material according to any one of [1] to [3], in which the electrode active material particles include as a main component one selected from a group of lithium cobaltate, lithium nickelate, lithium manganate, lithium titanate, and $Li_xA_yD_zPO_4$ (here, A represents one or more selected from the group consisting of Co, Mn, Ni, Fe, Cu, and Cr, D represents one or more selected from the group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$).

[5] Paste for electrodes including the electrode material according to any one of [1] to [4] and a binding agent.

[6] A lithium ion battery including a positive electrode current collector having an electrode material layer formed of the paste for electrodes according to [5] on a metal foil.

Advantage of the Invention

The electrode material, the paste for electrodes, and the lithium ion battery of the present invention are capable of improving the electron conductivity without impairing the lithium ion conductivity regardless of the use of an electrode active material having a carbonaceous film formed on the surface. Therefore, the electrode material, the paste for electrodes, and the lithium ion battery of the present invention are capable of suppressing the internal resistance of the battery at a low level, consequently, there is no concern of significant voltage drop, and high-speed charge and discharge can be carried out.

BEST MODE FOR CARRYING OUT THE INVENTION

Electrode Material

An electrode material of the present invention have a particulate shape, the electrode material is formed a carbonaceous film on surfaces of electrode active material particles, a coating proportion of the surfaces of the electrode active material particles by the carbonaceous film is 80% or more, and an apparent density ($\rho V$) of the carbonaceous film calculated from an amount of carbon in the electrode material, a specific surface area of the electrode material, and an average film thickness of the carbonaceous film is in a range of 0.10 g/cm$^3$ to 1.08 g/cm$^3$.

In the present invention, since the electrode material satisfying the above-described requirements is used, in a case in which the electrode material is used for a positive electrode of a lithium ion battery, it is possible to suppress the internal resistance of a battery at a low level, consequently, there is no concern of significant voltage drop, and high-speed charge and discharge can be carried out.

Electrode Active Material Particles

Examples of an electrode active material constituting the electrode active material particles include lithium cobaltate, lithium nickelate, lithium manganate, lithium titanate, and $Li_xA_yD_zPO_4$ (here, A represents one or more selected from a group consisting of Co, Mn, Ni, Fe, Cu, and Cr, D represents one or more selected from a group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$).

The electrode active material particles preferably include as a main component at least one selected from a group consisting of lithium cobaltate, lithium nickelate, lithium manganate, lithium titanate, and $Li_xA_yD_zPO_4$ and, among them, lithium oxoacid salt-based compounds represented by $Li_xA_yD_zPO_4$ are preferred since the compounds have an olivine-type crystal structure, voltage drop is likely to occur when high-speed discharge is carried out, and the effects of the configuration of the present invention are easily exhibited.

Here, the main component refers to a component having a content in the total mass of the electrode active material particles of more than 50% by mass. In addition, the content of the main component is more preferably 80% by mass or more, and still more preferably 90% by mass or more in the total mass of the electrode active material particles.

A in $Li_xA_yD_zPO_4$ is preferably Co, Mn, Ni, or Fe since it is easy to obtain a high discharge potential. D in $Li_xA_yD_zPO_4$ is preferably Mg, Ca, Sr, Ba, Ti, Zn, or Al since it is easy to obtain a high discharge potential.

In addition, the rare earth elements refer to 15 elements of La, Ce, Pr, Nd, Pm, Sm, Eu, Gd, Tb, Dy, Ho, Er, Tm, Yb, and Lu which belong to the lanthanum series.

Among them, the electrode active material is preferably $Li_xFe_yD_zPO_4$ (A is Fe), more preferably $Li_xFe_yPO_4$ (A is Fe and z is 0), and still more preferably $LiFePO_4$.

As the lithium oxoacid salt-based compound (olivine-type lithium-based compound) represented by $Li_xA_yD_zPO_4$, it is possible to use a compound manufactured using a method of the related art such as a solid phase method, a liquid phase method, or a gas phase method.

$Li_xA_yD_zPO_4$ can be obtained by, for example, hydrothermally synthesizing a slurry-form mixture obtained by mixing a Li source, an A source, a P source, water, and, if necessary, a D source, washing the obtained sediment using water so as to generate a precursor substance of the electrode active material, and furthermore firing the precursor substance. During the hydrothermal synthesis, a pressure-resistant airtight container is preferably used.

Here, examples of the Li source include lithium salts such as lithium acetate ($LiCH_3COO$) and lithium chloride ($LiCl$), lithium hydroxide ($LiOH$), and the like, and it is preferable to use at least one selected from a group consisting of lithium acetate, lithium chloride, and lithium hydroxide.

Examples of the A source include chlorides, carboxylate salts, hydrosulfate, and the like which include at least one selected from a group consisting of Co, Mn, Ni, Fe, Cu, and Cr. For example, in a case in which A is Fe, examples of a Fe source include divalent iron salts such as iron (II) chloride ($FeCl_2$) iron (II) acetate ($Fe(CH_3COO)_2$), and iron (II) sulfate ($FeSO_4$) and it is preferable to use at least one selected from a group consisting of iron (II) chloride, iron (II) acetate, and iron (II) sulfate.

Examples of the D source include chlorides, carboxylate salts, hydrosulfate, and the like which include at least one selected from a group consisting of Mg, Ca, S, Sr, Ba, Ti, Zn, B, Al, Ga, In, Si, Ge, Sc, Y, and rare earth elements.

Examples of the P source include phosphoric acid compounds such as phosphoric acid ($H_3PO_4$), ammonium dihydrogen phosphate ($NH_4H_2PO_4$), and diammonium hydrogen phosphate ($(NH_4)_2HPO_4$), and it is preferable to use at least one selected from a group consisting of phosphoric acid, ammonium dihydrogen phosphate, and diammonium hydrogen phosphate.

The size of the electrode active material particle is not particularly limited, and the average particle diameter of the primary particles is preferably in a range of 10 nm to 20,000 nm, and more preferably in a range of 20 nm to 5,000 nm.

When the average particle diameter of the primary particles of the electrode active material particles is 10 nm or more, it becomes possible to sufficiently coat the surfaces of the primary particles with the carbonaceous film, a decrease in the discharge capacity at a high-speed charge and discharge rate is suppressed, and it is possible to facilitate the realization of sufficient charge and discharge rate performance. In addition, when the average particle diameter of the primary particles of the electrode active material particles is 20,000 nm or less, the internal resistance of the primary particles does not easily become high, and the discharge capacity at a high-speed charge and discharge rate is not easily impaired.

In the present invention, the average particle diameter refers to the particle diameter D50 at which the cumulative volume percentage reaches 50% in the particle size distribution.

The average particle diameter of the primary particles of the electrode active material particles can be obtained by randomly selecting 500 particles, measuring the primary particle diameters of the respective particles using a scanning electron microscope, and calculating the particle diameter at a cumulative volume percentage of 50%. In a case in which the particles are not spherical, the average of the length (long diameter) of the longest line segment among line segments longitudinally traversing the particles and the length (short diameter) of a line segment orthogonally passes through the center point of the long diameter among the line segments longitudinally traversing the particles is used as the primary particle diameter of the respective particles.

The shape of the electrode active material particle is not particularly limited, but is preferably spherical, particularly, truly spherical. When the electrode active material particles are spherical, it is possible to reduce the amount of the solvent when paste for positive electrodes is prepared using the electrode material of the present invention, and it becomes easy to apply the paste for positive electrodes to a current collector. The paste for positive electrodes can be prepared by, for example, mixing the electrode material of the present invention, a binder resin (binding agent), and a solvent together.

In addition, when the shapes of the electrode active material particles are spherical, the surface area of the electrode active material particles is minimized, it is possible to set the blending amount of the binder resin (binding agent) added to the electrode material to the minimum amount, and it is possible to decrease the internal resistance of the obtained positive electrode, which is preferable.

Furthermore, when the shapes of the electrode active material particles are spherical, it is easy to closely pack the electrode active material, and thus the amount of a positive electrode material loaded per unit volume increases, and thus it is possible to increase the electrode density. As a result, it is possible to increase the capacity of the lithium ion battery, which is preferable.

The electrode active material particles may form an agglomerate in which the primary particles agglomerate together. The average particle diameter (average secondary particle diameter) in the agglomerate is preferably in a range of 0.5 μm to 100.0 μm and more preferably in a range of 1.0 μm to 50.0 μm. When the average particle diameter in the agglomerate is set to 0.5 μm or more, it is possible to easily prevent a decrease in the discharge capacity at a high-speed charge and discharge rate. In addition, when the average particle diameter in the agglomerate is set to 100 μm or less, a decrease in the discharge capacity which was triggered by the locally generated charge and discharge routes during high-speed charge and discharge made with uneven positive electrode surface caused by the agglomerate, is easily prevented.

Meanwhile, the average particle diameter in the agglomerate (average secondary particle diameter) refers to the particle diameter D50 at which the cumulative volume percentage reaches 50% in the particle size distribution, and can be measured using a laser scattering method.

Here, the agglomerate in which the primary particles agglomerate together refers to an agglomerate in a state in which the electrode active material particles having the carbonaceous film formed on the surfaces agglomerate together in a point contact state and thus are strongly connected together with the contact portions between the electrode active material particles forming neck-like shapes having a small cross-sectional area. When the contact portions between the electrode active material particles form neck-like shapes having a small cross-sectional area as described above, a structure in which a channel-shaped (net-shaped) space three-dimensionally spreads in the agglomerate is obtained.

The volume density of the agglomerate refers to a density that can be measured using a mercury porosimeter and is calculated from the entire mass of the electrode material configured of the agglomerates and the volume of voids present among the particles configuring the agglomerate. In other words, the volume density refers to the density of the agglomerate calculated from particle voids inside the particles of the agglomerate obtained by subtracting the voids among the agglomerate particles from the sum of the volumes of the particle voids configuring the agglomerate and the entire mass of the electrode material configured of the agglomerate.

The volume density of the agglomerate is preferably in a range of 50% by volume to 80% by volume, more preferably in a range of 55% by volume to 75% by volume, and still more preferably in a range of 60% by volume to 75% by volume of the volume density of the solid agglomerate.

The solid agglomerate refers to an agglomerate having no space therein and the density of the solid agglomerate is considered to be equal to the theoretical density of the electrode active material.

When the volume density of the agglomerate is set in a range of 50% by volume to 80% by volume, the agglomerate becomes dense in a state of having a certain amount of micropores (space), the strength of the entire agglomerate increases, the agglomerate does not easily break when, for example, an electrode slurry is prepared by mixing the electrode active material particles with a binding agent, a conductive auxiliary agent, and a solvent, consequently, an increase in the viscosity of the electrode slurry is suppressed, and the fluidity is maintained. Therefore, the coatability improves and the loading property of the electrode active material in a coated film of the electrode slurry can also be improved.

When the volume density of the agglomerate is outside the above-described range, for example, less than 50% by volume of the volume density of the solid agglomerate, the concentration of the vapor of an aromatic carbon compound in the micropores inside the agglomerate of the electrode active material becomes too low, the film thickness of the carbonaceous film in the center portion of the agglomerate becomes thin, and the internal resistance of the electrode active material becomes high, which is not preferable. On the other hand, when the volume density of the agglomerate exceeds 80% by volume of the volume density of the solid agglomerate, the density inside the agglomerate becomes too high, the volume of the channel-shaped (net-shaped) micropores inside the agglomerate becomes small, and consequently, a tarry substance generated during the carbonization of an organic compound is confined in the agglomerate, which is not preferable.

Carbonaceous Film

The carbonaceous film plays a role of imparting desired electron conductivity to the electrode material, but also serves as a hindrance to the redox reaction of lithium ions, and hinders the diffusion of lithium ions. Therefore, as the coating proportion by the carbonaceous film increases, and as the film thickness of the carbonaceous film increases, the conductivity of lithium ions is impaired. Therefore, the improvement of electron conductivity and the improvement of lithium ion conductivity have a trade-off relationship with each other. For example, in an electrode active material in which a carbonaceous film is supported, the electron conductivity improves, but the lithium ion conductivity is impaired, and thus the sum of the internal resistance of an electrode increases, and the voltage significantly drops when high-speed discharge is carried out.

In the present invention, when the coating proportion by the carbonaceous film is set to 80% or more and the apparent density ($\rho V$) of the carbonaceous film is set in a range of 0.10 g/cm$^3$ to 1.08 g/cm$^3$, the problem of the trade-off relationship of the carbonaceous film can be solved.

The coating proportion of the surfaces of the electrode active material particles by the carbonaceous film is preferably 85% or more and more preferably 90% or more.

The coating proportion of the surfaces of the electrode active material particles by the carbonaceous film can be calculated using the method described in examples.

The apparent density ($\rho V$) of the carbonaceous film is preferably in a range of 0.15 g/cm$^3$ to 0.80 g/cm$^3$ and more preferably in a range of 0.20 g/cm$^3$ to 0.60 g/cm$^3$.

The apparent density of the carbonaceous film can be calculated from the amount of carbon in the electrode material, the specific surface area of the electrode material, and the average film thickness of the carbonaceous film.

The carbonaceous film is obtained by carbonizing an organic compound that serves as a raw material for the carbonaceous film. The organic compound that serves as a raw material for the carbonaceous film and means for forming the carbonaceous film will be described in detail.

In the carbonaceous film, in order to prevent the lithium ion conductivity of the electrode material from being impaired, the migration path of lithium ions is preferably short.

In a case in which a structure that causes a hindrance to the migration of lithium ions in the carbonaceous film is present, lithium ions bypass the structure, and migrate. Examples of the structure include structures in which electrons are not localized such as the hexagonal plane of carbon.

Figure 1A:
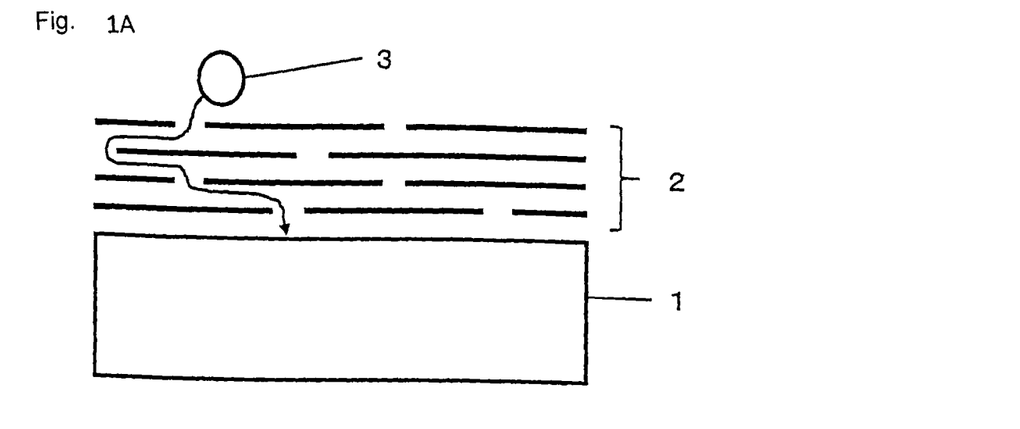
FIGS. 1A to 1C are imaginary views illustrating migration paths of a lithium ion in a carbonaceous film in an electrode material.
Figure 1B:
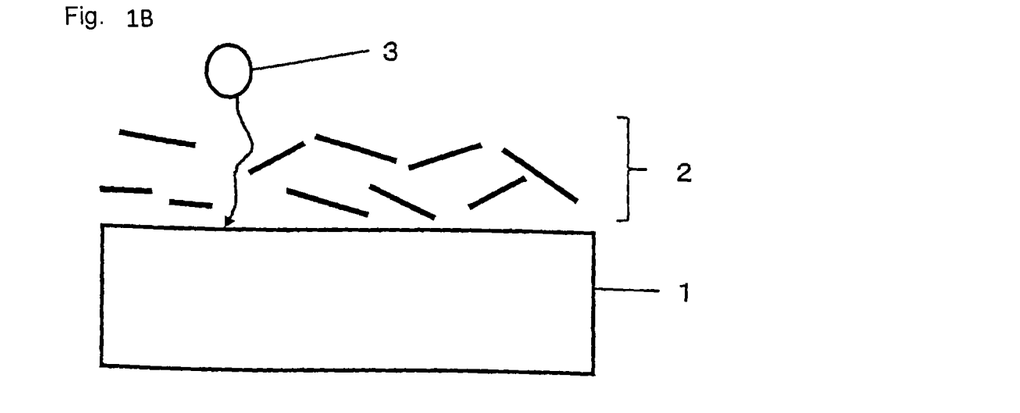
Figure 1C:
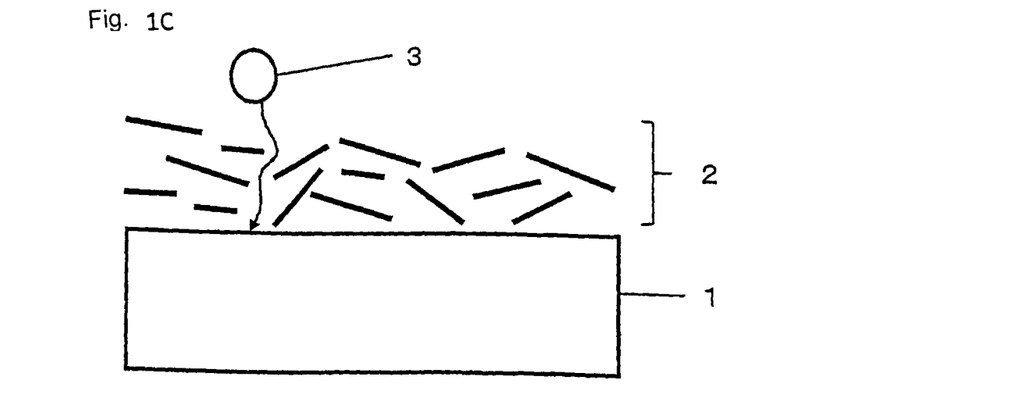

FIGS. 1A to 1C are imaginary views illustrating migration paths of a lithium ion in the carbonaceous film.

In a case in which graphene layers forming the carbonaceous film are densely disposed as illustrated in FIG. 1A, the electron conductivity improves, but the migration path of the lithium ion becomes long and the conductivity of lithium ions deteriorates.

On the other hand, in a case in which the graphene layers forming the carbonaceous film are disposed with gaps therein as illustrated in FIG. 1B, the migration path of the lithium ion becomes short and the conductivity of lithium ions improves, but the contact between graphenes decreases and the electron conductivity deteriorates.

A state in which the graphene layers forming the carbonaceous film have gaps therebetween and graphenes are appropriately in contact with each other as illustrated in FIG. 1C is preferred since the electron conductivity improves without impairing the conductivity of lithium ions and the trade-off problem is solved.

When the coating proportion and apparent density of the carbonaceous film are set in the above-described ranges, it is possible to easily obtain the structure of the carbonaceous film as illustrated in FIG. 1C.

In the present invention, when the proportion of a carbon component in the total mass of the electrode material is in a range of 0.6% by mass to 5.0% by mass, the true density ($\rho T$) of the carbonaceous film obtained using a gas-phase substitution method is in a range of 1.80 g/cm$^3$ to 2.50 g/cm$^3$, and the ratio ($\rho V/\rho T$) of the apparent density ($\rho V$) of the carbonaceous film to the true density of the carbonaceous film is in a range of 0.04 to 0.60, it is possible to obtain electrode active material particles on which the carbonaceous film is appropriately formed in consideration of the relationship between the electrode active material and the carbonaceous film, the coating proportion by the carbonaceous film, the film thickness of the carbonaceous film, and the like, which is preferable.

The more detailed description of the technical meaning of the ratio ($\rho V/\rho T$) of the apparent density ($\rho V$) of the carbonaceous film to the true density of the carbonaceous film is as described below. In a case in which $\rho V/\rho T$ is greater than 0.60, the charge migration resistance in the carbonaceous film becomes high, consequently, the internal resistance of a battery increases, and voltage drop at a high charge-discharge rate becomes significant. On the other hand, in a case in which $\rho V/\rho T$ is smaller than 0.04, the lithium ion migration resistance becomes high due to the steric hindrance to the diffusion of lithium ions in the carbonaceous film, consequently, the internal resistance of a battery increases, and voltage drop at a high charge-discharge rate becomes significant. Therefore, setting $\rho V/\rho T$ in a range of 0.04 to 0.60 is significantly meaningful in terms of further improving the effects of the present invention.

The "internal resistance" mentioned herein refers to the sum of, mainly, the charge migration resistance and the lithium ion resistance, the charge migration resistance is inversely proportional to the film thickness of the carbonaceous film and the density and crystallinity of the carbonaceous film, and the lithium ion migration resistance is proportional to the film thickness of the carbonaceous film and the density and crystallinity of the carbonaceous film.

As a method for assessing the internal resistance, for example, a current rest method or the like is used. In the current rest method, the internal resistance is measured as the sum of interconnection resistance, contact resistance, charge migration resistance, lithium ion migration resistance, lithium reaction resistances in the positive and negative electrodes, interelectrode resistance determined by the distance between the positive and negative electrodes, the resistance relating to the solvation and desolvation of the lithium ions, and the solid electrolyte interface (SEI) migration resistance of lithium ions.

The proportion of the carbon component in the total mass of the electrode material is preferably set in a range of 0.7% by mass to 4.0% by mass, more preferably set in a range of 0.8% by mass to 2.5% by mass, and still more preferably set in a range of 0.9% by mass to 1.5% by mass. The amount of carbon in the electrode material can be calculated using the method described in the examples.

The true density ($\rho T$) of the carbonaceous film is preferably set in a range of 1.85 g/cm$^3$ to 2.35 g/cm$^3$ and more preferably set in a range of 1.90 g/cm$^3$ to 2.20 g/cm$^3$.

The ratio ($\rho V/\rho T$) of the apparent density of the carbonaceous film to the true density of the carbonaceous film is preferably set in a range of 0.08 to 0.50, and more preferably set in a range of 0.12 to 0.40.

The film thickness of the carbonaceous film is preferably in a range of 0.5 nm to 20 nm, more preferably in a range of 1 nm to 10 nm, and still more preferably in a range of 1 nm to 5 nm.

When the film thickness of the carbonaceous film is 0.5 nm or more, the sum of the migration resistances of electrons in the carbonaceous film does not easily become high, an increase in the internal resistance of the battery is suppressed, and it is possible to facilitate the prevention of voltage drop at a high-speed charge and discharge rate. When the film thickness of the carbonaceous film is 20 nm or less, the steric hindrance is suppressed when lithium ions diffuse in the carbonaceous film, and the migration resistance of lithium ions becomes small, and consequently, an increase in the internal resistance of the battery is suppressed, and it is possible to facilitate the prevention of voltage drop at a high-speed charge and discharge rate.

The average value of the film thicknesses of the carbonaceous films in 20 single particles of the electrode material is used as the film thickness of the carbonaceous film. In addition, the film thickness of the carbonaceous film in a single particle of the electrode material is obtained by measuring the film thicknesses at 20 arbitrary positions of the carbonaceous film on the surface of the electrode material, and obtaining the average value of the film thicknesses of the 20 positions. Specifically, the film thickness of the carbonaceous film can be calculated using a method described in the examples.

The proportion of the carbon component in the total mass of the carbonaceous film is preferably 50% by mass or more, and more preferably 60% by mass or more. When the proportion is set to 50% by mass or more, the charge migration resistance of the carbonaceous film is suppressed, consequently, the internal resistance of the battery decreases, and voltage drop at a high charge-discharge rate can be suppressed.

Since the carbonaceous film is formed by the thermal decomposition of an organic compound which is a precursor of carbon, inevitably, the carbonaceous film contains elements other than carbon such as hydrogen and oxygen. Therefore, when the firing conditions are not appropriate, the proportion of the carbon component in the total mass of the carbonaceous film remains below 50% by mass, the charge migration resistance of the carbonaceous film becomes high, consequently, the internal resistance of the battery increases, and voltage drop at a high charge-discharge rate becomes significant. On the other hand, when the firing conditions are set to be appropriate, it is possible to set the proportion of the carbon component in the total mass of the carbonaceous film to 50% by mass or more, the charge migration resistance of the carbonaceous film is suppressed, consequently, the internal resistance of the battery decreases, and voltage drop at a high charge-discharge rate can be suppressed.

Raw Material of Carbonaceous Film and Means for Forming Carbonaceous Film

The organic compound that serves as a raw material for the carbonaceous film is not particularly limited as long as the compound is capable of forming the carbonaceous film on the surfaces of the electrode active material particles, and examples thereof include polyvinyl alcohol (PVA), polyvinyl pyrrolidone, cellulose such as methyl cellulose and ethyl cellulose, starch, gelatin, hyaluronic acid, sugars such as grape sugar (D-glucose), fruit sugar (D-fructose), sucrose, and lactose, higher monovalent alcohols such as hexanol and octanol, unsaturated monovalent alcohols such as allyl alcohols, propynol (propargyl alcohol), and terpineol, polyvinyl acetate, polyethers, and the like.

The carbonaceous film can be formed on the surface of the electrode active material particles through the following steps (1) and (2). In other words, the electrode material of the present invention can be manufactured through the following steps (1) and (2):

(1) a slurry preparation step of preparing a slurry including the electrode active material particles and/or a precursor of the electrode active material particles, and the organic compound, and (2) a step of drying the slurry so as to generate a granulated body having a film including the organic compound on a surface, firing the granulated body in a non-oxidative atmosphere so as to carbonize the organic compound, thereby forming a carbonaceous film made of a carbonaceous material coming from the organic compound on the surface of the granulated body.

In Step (1), a solvent such as water is preferably further added to the slurry.

The organic compound is preferably used so that the amount of carbon in the organic compound reaches a predetermined amount with respect to the electrode active material particles and/or the precursor of the electrode active material particles. Specifically, the organic compound is blended so that the amount of carbon in the organic compound preferably falls in a range of 0.6 parts by mass to 8.0 parts by mass, and more preferably falls in a range of 1.1 parts by mass to 4.0 parts by mass with respect to a total of 100 parts by mass of the electrode active material particles and/or the precursor of the electrode active material particles.

When the blending ratio of the organic compound in terms of the amount of carbon is 0.6 parts by mass or more, the discharge capacity at a high-speed charge and discharge rate does not easily become low in a case in which a battery is formed, and it is possible to realize sufficient charge and discharge rate performance. When the blending ratio of the organic compound in terms of the amount of carbon is 8.0 parts by mass or less, the steric hindrance is small when lithium ions diffuse in the carbonaceous film, and the lithium ion migration resistance becomes small. As a result, the internal resistance of the battery does not easily increase in a case in which a battery is formed, and it is possible to suppress voltage drop at a high-speed charge and discharge rate.

When the slurry is prepared, it is preferable to dissolve or disperse the electrode active material particles and/or the precursor of the electrode active material particles and the organic compound in water. During the dissolution or dispersion, a dispersant is preferably added, and a dispersion apparatus such as a planetary ball mill, an oscillation ball mill, a bead mill, a paint shaker, or an attritor is preferably used.

During the dissolution or dispersion, it is preferable to disperse in water the electrode active material particles and/or the precursor of the electrode active material particles in a primary particle form, and then add and stir the organic compound so as to be dissolved. Therefore, it is possible to facilitate the coating of the surfaces of the primary particles of the electrode active material particles with the organic compound.

In Step (2), a step in which the slurry prepared in Step (1) is dried so as to generate a granulated body having a film including the organic compound on the surface, the granulated body is fired in a non-oxidative atmosphere so as to carbonize the organic compound, thereby forming a carbonaceous film made of a carbonaceous material coming from the organic compound on the surface of the granulated body is carried out. The granulated body generally has a form of an agglomerate in which the primary particles of the electrode active material particles are agglomerated together. The precursor of the electrode active material particles turns into electrode active material particles when fired.

Examples of means for generating the granulated body by drying the slurry include means for spraying the slurry in a high-temperature atmosphere. Here, the high-temperature atmosphere refers to an atmosphere at, for example, approximately 70° C. to 250° C.

The non-oxidative atmosphere is preferably an inert atmosphere in which an inert gas such as nitrogen (N2), argon (Ar), or the like is used, and in a case in which it is necessary to further suppress oxidization, a reducing atmosphere including approximately several % by volume of a reducing gas such as hydrogen (H2) is preferred.

The firing temperature is preferably in a range of 500° C. to 1000° C., and more preferably in a range of 650° C. to 900° C., and the firing time is in a range of approximately 0.1 hours to 40 hours.

When the firing temperature is set to 500° C. or higher, it is easy to sufficiently carbonize the organic compound. When the firing temperature is set to 1000° C. or lower, Li in the electrode active material is not easily evaporated, and the grain growth of the electrode active material is suppressed. As a result, it is possible to prevent the discharge capacity at a high-speed charge and discharge rate from becoming low, and it is possible to realize sufficient charge and discharge rate performance.

The carbonaceous film is preferably formed on the surfaces of the electrode active material particles through the following steps (1') and (2'). In other words, the electrode material of the present invention is preferably manufactured through the following steps (1') and (2'):

(1') a slurry preparation step of preparing a slurry including the electrode active material particles and/or a precursor of the electrode active material particles, an organic compound i, and an organic compound ii, and (2') a step of drying the slurry so as to generate a particulate body having a film including the organic compounds i and ii on a surface, firing the particulate body in a non-oxidative atmosphere so as to remove the organic compound ii from the film and carbonize the organic compound i, thereby forming a carbonaceous film made of a carbonaceous material coming from the organic compound i on the surface of the granulated body.

With the electrode material obtained through Steps (1') and (2'), voltage drop occurring when high-speed charge and discharge is carried out is easily suppressed and a lithium phosphate compound having electron conductivity and lithium ion conductivity which satisfy the high-speed charge and discharge characteristics can be realized.

This is considered to be because, in the stage of forming the particulate body, the film including the organic compounds i and ii is present on the surface of the granulated body; however, in the firing stage for forming the carbonaceous film, the organic compound ii that is one of the components constituting the film on the granulated body is removed, and thus the number of gaps between the graphene layers constituting the carbonaceous film increases, and the migration of lithium ions becomes easy.

Meanwhile, the organic compound ii is considered to be removed from the film on the granulated body since, in the firing stage, the organic compound ii or the decomposed substance thereof is combusted or evaporated.

Therefore, in the electrode material obtained through the above-described steps (1') and (2'), it is possible to facilitate the setting of "the coating proportion by the carbonaceous film", "the apparent density of the carbonaceous film", "the true density of the carbonaceous film", and "the ratio ($\rho V/\rho T$) of the apparent density of the carbonaceous film to the true density of the carbonaceous film" in the above-described ranges.

While the specific structure of the carbonaceous film after Step (2') is not clear, the schematic illustration of the structure is considered to look like the state of FIG. 1C.

Meanwhile, the carbonaceous film after Step (2') is made of the carbonaceous material coming from the organic compound i, but the carbonaceous film may include a small amount of a carbonaceous material made of a carbonaceous material coming from the organic compound ii to the extent that the effects of the present invention are not impaired.

The firing in Step (2') is carried out in a non-oxidative atmosphere in which an inert gas and a reducing gas, which is added if necessary, are used, and, in order to facilitate the removal of the organic compound ii, it is preferable to introduce a small amount of combustion-enhancing and/or burnable gases such as oxygen ($O_2$) and lower alcohols. The proportion of the combustion-enhancing and/or burnable gases accounting for the total gas components constituting the non-oxidative atmosphere is preferably in a range of 1.0% by volume to 8.0% by volume, and more preferably in a range of 2.0% by volume to 4.0% by volume.

The firing temperature in Step (2') is preferably in a range of 500° C. to 1000° C., and more preferably in a range of 650° C. to 900° C. In addition, the firing temperature is preferably 100° C. or higher than the thermal decomposition temperature in the non-oxidative atmosphere of the organic compound ii. The firing time is in a range of approximately 0.1 hours to 40 hours.

As the organic compound i, any organic compound can be used without any particular limitation as long as the organic compound is capable of forming the carbonaceous film without being removed from the film on the granulated body through the firing step.

The organic compound i is preferably polyvinyl alcohol (PVA), polyvinyl pyrrolidone, starch, gelatin, hyaluronic acid, sugars such as grape sugar (D-glucose), fruit sugar (D-fructose), sucrose, or lactose, or polyvinyl acetate. The weight-average molecular weight of a macromolecular material is preferably 5000 or more, and more preferably in a range of 8000 to 100000.

As the organic compound ii, any organic compound can be used without any particular limitation as long as the organic compound is removed from the film on the granulated body through the firing step.

Particularly, the organic compound ii is preferably a higher saturated monovalent alcohol such as octanol, nonanol, decanol, or dodecanol, an unsaturated monovalent alcohol such as allyl alcohol, propynol (propargyl alcohol), or terpineol, polyethylene, polypropylene, polybutylene, polyethylene glycol, polypropylene glycol, polybutylene glycol, polyether glycol, polytetramethylene ether glycol, a cellulose such as carboxymethyl cellulose or ethyl cellulose, a plant fiber, fibrin, a chemical fiber, or the like.

When the blending amount of the organic compound i in the slurry is set to 100 parts by mass, the blending amount of the organic compound ii is preferably set in a range of 5 parts by mass to 100 parts by mass, more preferably set in a range of 10 parts by mass to 80 parts by mass, and still more preferably set in a range of 15 parts by mass to 60 parts by mass. When the blending amount is set in the above-described range, it is possible to facilitate the setting of "the coating proportion by the carbonaceous film", "the apparent density of the carbonaceous film" "the true density of the carbonaceous film", and "the ratio ($\rho V/\rho T$) of the apparent density of the carbonaceous film to the true density of the carbonaceous film" in the above-described ranges.

Properties of Electrode Material

In the electrode material of the present invention, from the viewpoint of the improvement of the electron conductivity, the powder resistance value is preferably 300 Ω·cm or less, more preferably 250 Ω·cm or less, still more preferably 230 Ω·cm or less, and far still more preferably in a range of 100 Ω·cm to 220 Ω·cm.

The powder resistance value can be measured from a specimen obtained by molding the electrode material at a pressure of 50 MPa and, specifically, the powder resistance value can be measured using the method described in the examples.

In the electrode material of the present invention, the ratio between the powder resistance value (Ω·cm) and the proportion (% by mass) of the carbon component in the total mass of the electrode material is preferably 300 or less, more preferably 250 or less, and still more preferably in a range of 1 to 230. The electrode material satisfying the above-described conditions indicates that the amount of carbon in the electrode material necessary to increase the electron conductivity is small, the electron conductivity and the lithium ion conductivity are both satisfied, and the trade-off problem can be solved.

Paste for Electrodes

The paste for electrodes in the present invention includes the electrode material of the present invention and a binding agent.

As the binding agent, for example, a macromolecular resin such as a polytetrafluoroethylene (PTFE) resin, a polyvinylidene fluoride (PVdF) resin, or fluororubber is preferably used.

The blending ratio of the binding agent to the electrode material is not particularly limited, and, for example, the amount of the binding agent blended is preferably in a range of 1 part by mass to 30 parts by mass, and more preferably in a range of 3 parts by mass to 20 parts by mass with respect to 100 parts by mass of the electrode material.

The paste for electrodes preferably further includes a solvent and a conductive auxiliary agent.

The solvent used for paint for electrode formation or paste for electrode formation may be appropriately selected in accordance with the properties of the binder resin.

Examples thereof include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutylketone(MIBK), acetylacetone, and cyclohexanone; amides such as dimethylformamide, N,N-dimethylacetoamide, and N-methyl pyrrolidone; glycols such as ethylene glycol, diethylene glycol, and propylene glycol; and the like. These solvents may be singly used, or a mixture of two or more solvents may be used.

Electrode and Lithium Ion Battery

An electrode of the present invention can be obtained by applying the paste for electrodes in the present invention to one surface of a metal foil, and drying the paste so as to form a coated film, and then bonding the coated film by pressing so as to produce an electrode material layer.

Through the above-described steps, the electrode having excellent output characteristics can be produced. The electrode is useful as positive electrodes for lithium ion batteries.

In addition, a lithium ion battery of the present invention includes a positive electrode collector having the electrode material layer formed of the paste for electrodes of the present embodiment on a metal foil.

In the electrode and lithium ion battery of the present invention, the internal resistance of the electrode can be decreased by producing the electrode using the electrode material of the present invention. Therefore, it is possible to suppress the internal resistance of the battery at a low level, and consequently, it is possible to provide a lithium ion battery capable of carrying out high-speed charge and discharge without any concern of a significant voltage drop.

In the lithium ion battery of the present invention, there is no particular limitation regarding the negative electrode, an electrolytic solution, a separator, and the like. For example, for the negative electrode, it is possible to use a negative electrode material such as Li metal, a carbon material, a Li alloy, or $Li_4Ti_5O_{12}$. In addition, a solid electrolyte may be used in place of the electrolytic solution and the separator.

EXAMPLES

Next, the present invention will be described in more detail using the examples, but the present invention is not limited by the examples.

1. Measurement

The following measurements were carried out on electrode materials of examples and comparative examples. The results are described in Tables 1 to 3.

(1) Coating Proportion by Carbonaceous Film

The carbonaceous film in the electrode material was observed using a transmission electron microscope (TEM) and an energy-dispersive X-ray spectroscope (EDX), and the proportion of portions coated with the carbonaceous film in the surface of the electrode material was calculated and was considered as the coating proportion.

(2) Apparent Density of Carbonaceous Film

The apparent density of the carbonaceous film was calculated from the amount of carbon in the electrode material, the specific surface area of the electrode active material, and the film thickness of the carbonaceous film.

(3) True Density of Carbonaceous Film 100 g of the electrode material was immersed in 1 L of 8 N hydrochloric acid, was stirred for 1 day, and then was separated into solid and liquid. A substance obtained by washing and drying a solid-phase component was considered as an acid dissolution residual carbonaceous film. The true density of the acid dissolution residual carbonaceous film was measured using a gas substitution-type densimeter (trade name: AccuPyc1330) manufactured by Shimadzu Corporation. In the measurement of the true density, helium gas was used, air and moisture inside a sample and a specimen chamber were completely removed by carrying out purging several times, and then a change in the pressure of helium in the specimen chamber having a corrected volume was measured, thereby calculating the volume and density of the specimen.

(4) Amount of Carbon in Electrode Material

The proportion (% by mass) of the carbon component in the total mass of the electrode material was measured using a carbon analyzer.

(5) Amount of Carbon in Carbonaceous Film

The proportion (% by mass) of the carbon component in the acid dissolution residual carbonaceous film obtained in the above-described (3) was measured using a carbon analyzer.

(6) Specific Surface Area

The specific surface area of the electrode material was measured using a specific surface area meter (manufactured by BEL Japan, Inc., trade name: BELSORP-mini) and a BET method in which the adsorption of nitrogen ($N_2$) was used.

(7) Average Film Thickness of Carbonaceous Film

The film thickness of the carbonaceous film at 20 arbitrary positions on a single electrode active material particle in the electrode material was calculated using a transmission electron microscope, and the average of the thicknesses at the 20 positions was calculated. The processes were carried in each of 20 particles, and the average value thereof was considered as the thickness of the carbonaceous film.

(8) Average Particle Diameter (D50)

The average particle diameter (D50) of the electrode material was measured using a laser diffraction-type particle size distribution measurement instrument (manufactured by Shimadzu Corporation, trade name: SALD-1000).

(9) Powder Resistance Value

The electrode material was injected into a mold, and was molded at a pressure of 50 MPa, thereby producing a specimen. The powder resistance value ($\Omega \cdot cm$) of the specimen was measured using a low resistivity meter (manufactured by Mitsubishi Chemical Corporation, trade name: Loresta-GP) through a four point measurements at 25° C.

2. Production of the Electrode Material

Example 1

4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture. Next, the mixture was accommodated in a pressure-resistant airtight container having a capacity of 8 L, and was hydrothermally synthesized for 1 hour at 200° C. Next, the obtained sediment was washed using water, thereby obtaining a cake-form precursor of an electrode active material.

Next, an aqueous solution obtained by dissolving 1.5 g of polyvinyl pyrrolidone and 0.15 g of carboxymethyl cellulose in 100 g of water and 100 g of the precursor of the electrode active material (in terms of the solid content) were mixed so as to produce a slurry, and a dispersion treatment was carried out on the slurry using a binary fluid-type wet jet crusher so that the average particle diameter (D50) of the primary particles of precursor particles of the electrode active material in the slurry reached 50 nm. Regarding the content of the organic compound in the slurry of Example 1, the amount of carboxymethyl cellulose (organic compound ii) was 10 parts by mass with respect to 100 parts by mass of polyvinyl pyrrolidone (organic compound i).

Next, the slurry on which the dispersion treatment had been carried out was sprayed and dried in the atmosphere at 180° C., thereby obtaining a granulated body having a film including polyvinyl pyrrolidone and carboxymethyl cellulose on the surface.

Next, the obtained granulated body was fired at 700° C. for 0.1 hours in a non-oxidative atmosphere (100% by volume of nitrogen and 0% by volume of oxygen) so as to remove carboxymethyl cellulose from the film and carbonize polyvinyl pyrrolidone, thereby obtaining an electrode material having a carbonaceous film formed on the surface of an electrode active material made of $LiFePO_4$ having an olivine-type crystal structure.

Example 2

An electrode material was obtained in the same manner as in Example 1 except for the fact that the amount of carboxymethyl cellulose added to produce the slurry was changed to 0.375 g and the firing temperature of the granulated body in the non-oxidative atmosphere was set to 720° C. Regarding the content of the organic compound in the slurry of Example 2, the amount of carboxymethyl cellulose (organic compound ii) was 25 parts by mass with respect to 100 parts by mass of polyvinyl pyrrolidone (organic compound i).

Example 3

An electrode material was obtained in the same manner as in Example 1 except for the fact that the amount of carboxymethyl cellulose added to produce the slurry was changed to 0.75 g and the firing temperature of the granulated body in the non-oxidative atmosphere was set to 740° C. Regarding the content of the organic compound in the slurry of Example 3, the amount of carboxymethyl cellulose (organic compound ii) was 50 parts by mass with respect to 100 parts by mass of polyvinyl pyrrolidone (organic compound i).

Example 4

An electrode material was obtained in the same manner as in Example 1 except for the fact that the amount of carboxymethyl cellulose added to produce the slurry was changed to 1.2 g and the firing temperature of the granulated body in the non-oxidative atmosphere was set to 780° C. Regarding the content of the organic compound in the slurry of Example 4, the amount of carboxymethyl cellulose (organic compound ii) was 100 parts by mass with respect to 100 parts by mass of polyvinyl pyrrolidone (organic compound i).

Example 5

4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture. Next, the mixture was accommodated in a pressure-resistant airtight container having a capacity of 8 L, and was hydrothermally synthesized for 1 hour at 200° C. Next, the obtained sediment was washed using water, thereby obtaining a cake-form precursor of an electrode active material.

Next, an aqueous solution obtained by dissolving 1.0 g of fructose and 0.05 g of polybutylene glycol in 100 g of water and 100 g of the precursor of the electrode active material (in terms of the solid content) were mixed so as to produce a slurry, and a dispersion treatment was carried out on the slurry using a binary fluid-type wet jet crusher so that the average particle diameter (D50) of the primary particles of precursor particles of the electrode active material in the slurry reached 50 nm. Regarding the content of the organic compound in the slurry of Example 5, the amount of polybutylene glycol (organic compound ii) was 5 parts by mass with respect to 100 parts by mass of fructose (organic compound i).

Next, the slurry on which the dispersion treatment had been carried out was sprayed and dried in the atmosphere at 180° C., thereby obtaining a granulated body having a film including fructose and polybutylene glycol on the surface.

Next, the obtained granulated body was fired at 700° C. for 2 hours in a non-oxidative atmosphere (95% by volume of nitrogen and 5% by volume of oxygen) so as to remove polybutylene glycol from the film and carbonize fructose, thereby obtaining an electrode material having a carbonaceous film formed on the surface of an electrode active material made of $LiFePO_4$ having an olivine-type crystal structure.

Example 6

An electrode material was obtained in the same manner as in Example 5 except for the fact that, when the slurry was produced, the amount of fructose added was changed to 3.0 g, the amount of polybutylene glycol added was changed to 0.15 g, and the firing temperature of the granulated body in the non-oxidative atmosphere was set to 720° C. Regarding the content of the organic compound in the slurry of Example 6, the amount of polybutylene glycol (organic compound ii) was 5 parts by mass with respect to 100 parts by mass of fructose (organic compound i).

Example 7

An electrode material was obtained in the same manner as in Example 5 except for the fact that, when the slurry was produced, the amount of fructose added was changed to 7.0 g, the amount of polybutylene glycol added was changed to 0.35 g, and the firing temperature of the granulated body in the non-oxidative atmosphere was set to 740° C. Regarding the content of the organic compound in the slurry of Example 7, the amount of polybutylene glycol (organic compound ii) was 5 parts by mass with respect to 100 parts by mass of fructose (organic compound i).

Example 8

An electrode material was obtained in the same manner as in Example 5 except for the fact that, when the slurry was produced, the amount of fructose was changed to 7.0 g, the amount of polybutylene glycol added was changed to 0.35 g, and the firing temperature of the granulated body in the non-oxidative atmosphere was set to 780° C. Regarding the content of the organic compound in the slurry of Example 8, the amount of polybutylene glycol (organic compound ii) was 5 parts by mass with respect to 100 parts by mass of fructose (organic compound i).

Example 9

4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture. Next, the mixture was accommodated in a pressure-resistant airtight container having a capacity of 8 L, and was hydrothermally synthesized for 1 hour at 200° C. Next, the obtained sediment was washed using water, thereby obtaining a cake-form precursor of an electrode active material.

Next, an aqueous solution obtained by dissolving 2.0 g of sucrose and 0.02 g of terpineol in 100 g of water and 100 g of a precursor of the electrode active material (in terms of the solid content) were mixed so as to produce a slurry, and a dispersion treatment was carried out on the slurry using a binary fluid-type wet jet crusher so that the average particle diameter (D50) of the primary particles of precursor particles of the electrode active material in the slurry reached 50 nm. Regarding the content of the organic compound in the slurry of Example 9, the amount of terpineol (organic compound ii) was 1 parts by mass with respect to 100 parts by mass of sucrose (organic compound i).

Next, the slurry on which the dispersion treatment had been carried out was sprayed and dried in the atmosphere at 180° C., thereby obtaining a granulated body having a film including sucrose and terpineol on the surface.

Next, the obtained granulated body was fired at 700° C. for 5 hours in a non-oxidative atmosphere (90% by volume of nitrogen and 10% by volume of oxygen) so as to remove terpineol from the film and carbonize sucrose, thereby obtaining an electrode material having a carbonaceous film formed on the surface of an electrode active material made of $LiFePO_4$ having an olivine-type crystal structure.

Example 10

An electrode material was obtained in the same manner as in Example 9 except for the fact that, when the slurry was produced, the amount of sucrose added was changed to 2.5 g, the amount of terpineol added was changed to 0.025 g, and the firing temperature of the granulated body in the non-oxidative atmosphere was set to 720° C. Regarding the content of the organic compound in the slurry of Example 10, the amount of terpineol (organic compound ii) was 1 part by mass with respect to 100 parts by mass of sucrose (organic compound i).

Example 11

An electrode material was obtained in the same manner as in Example 9 except for the fact that, when the slurry was produced, the amount of sucrose added was changed to 3.0 g, the amount of terpineol added was changed to 0.03 g, and the firing temperature of the granulated body in the non-oxidative atmosphere was set to 740° C. Regarding the content of the organic compound in the slurry of Example 11, the amount of terpineol (organic compound ii) was 1 part by mass with respect to 100 parts by mass of sucrose (organic compound i).

Example 12

An electrode material was obtained in the same manner as in Example 9 except for the fact that, when the slurry was produced, the amount of sucrose added was changed to 4.5 g, the amount of terpineol added was changed to 0.045 g, and the firing temperature of the granulated body in the non-oxidative atmosphere was set to 780° C. Regarding the content of the organic compound in the slurry of Example 12, the amount of terpineol (organic compound ii) was 1 part by mass with respect to 100 parts by mass of sucrose (organic compound i).

Comparative Example 1

An electrode material was obtained in the same manner as in Example 1 except for the fact that the amount of carboxymethyl cellulose added to produce the slurry was changed to 10.50 g and the firing temperature of the granulated body in the non-oxidative atmosphere was set to 720° C.

Comparative Example 2

An electrode material was obtained in the same manner as in Example 1 except for the fact that, when the slurry was produced, the amount of polyvinyl pyrrolidone added was changed to 2.0 g, the amount of carboxymethyl cellulose added was changed to 16.0 g, and the firing temperature of the granulated body in the non-oxidative atmosphere was set to 780° C.

Comparative Example 3

An electrode material was obtained in the same manner as in Example 1 except for the fact that, when the slurry was produced, the amount of polyvinyl pyrrolidone added was changed to 4.0 g, the amount of carboxymethyl cellulose added was changed to 36.0 g, and the firing temperature of the granulated body in the non-oxidative atmosphere was set to 850° C.

Comparative Example 4

An electrode material was obtained in the same manner as in Example 9 except for the fact that the firing temperature of the granulated body in the non-oxidative atmosphere was set to 600° C.

Comparative Example 5

An electrode material was obtained in the same manner as in Example 9 except for the fact that, when the slurry was produced, the amount of sucrose added was changed to 4.0 g, the amount of terpineol added was changed to 0.04 g, the firing temperature of the granulated body in the non-oxidative atmosphere was set to 720° C., and the non-oxidative atmosphere was set to 85% by volume of nitrogen and 15% by volume of oxygen.

Comparative Example 6

An electrode material was obtained in the same manner as in Example 9 except for the fact that, when the slurry was produced, the amount of sucrose added was changed to 10.0 g, the amount of terpineol added was changed to 0.10 g, the firing temperature of the granulated body in the non-oxidative atmosphere was set to 740° C., and the non-oxidative atmosphere was set to 82% by volume of nitrogen and 18% by volume of oxygen.

Comparative Example 7

An electrode material was obtained in the same manner as in Example 9 except for the fact that, when the slurry was produced, the amount of sucrose added was changed to 14.0 g, the amount of terpineol added was changed to 0.14 g, the firing temperature of the granulated body in the non-oxidative atmosphere was set to 780° C., and the non-oxidative atmosphere was set to 80% by volume of nitrogen and 20% by volume of oxygen.

3. Production of Slurries for Electrodes and Electrodes

The electrode material, a binder resin (polyvinylidene fluoride), and a conductive auxiliary agent (acetylene black) were mixed so that the mass ratio reached 90:5:5, and furthermore, N-methyl-2-pyrrolidinone (NMP) was added as a solvent so as to impart fluidity, thereby producing a slurry for electrodes.

Next, the slurry for electrodes was applied onto a 15 µm-thick aluminum (Al) foil, and was dried. After that, the slurry was pressurized at a pressure of 600 kgf/cm$^2$, thereby producing a positive electrode of a lithium ion battery.

4. Production of an Electrode

Lithium metal was disposed as a negative electrode against the positive electrode of the lithium ion battery, and a separator made of porous polypropylene was disposed between the positive electrode and the negative electrode, thereby producing a battery member.

Meanwhile, ethylene carbonate and diethyl carbonate were mixed together in (a mass ratio of) 1:1, and furthermore 1 M of a $LiPF_6$ solution was added, thereby producing an electrolyte solution having lithium ion conductivity.

Next, the battery member was immersed in the electrolyte solution, thereby producing the lithium ion battery.

TABLE 1

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Coating proportion (%) | 85 | 87 | 87 | 90 | 88 | 87 | 93 | 95 | 89 | 89 | 91 | 87 |
| Apparent density ($\rho V$) (g/cm$^3$) | 0.50 | 0.30 | 0.15 | 0.10 | 0.80 | 0.72 | 0.75 | 0.71 | 1.08 | 1.05 | 1.06 | 1.08 |
| True density ($\rho T$) (g/cm$^3$) | 1.80 | 2.00 | 2.30 | 2.50 | 1.90 | 2.10 | 2.30 | 2.50 | 1.80 | 2.00 | 2.20 | 2.50 |
| $\rho V/\rho T$ | 0.28 | 0.15 | 0.07 | 0.04 | 0.42 | 0.34 | 0.33 | 0.28 | 0.60 | 0.53 | 0.48 | 0.43 |
| Amount of carbon in electrode material (% by mass) | 0.8 | 1.1 | 0.9 | 1.0 | 0.6 | 1.7 | 4.3 | 5.0 | 1.2 | 1.1 | 1.5 | 2.2 |
| Amount of carbon in carbonaceous film (% by mass) | 50 | 68 | 85 | 92 | 50 | 66 | 87 | 94 | 51 | 65 | 83 | 95 |
| Specific surface area (m$^2$/g) | 11.48 | 10.02 | 7.23 | 5.41 | 8.64 | 9.92 | 12.97 | 15.83 | 10.26 | 10.64 | 10.51 | 10.63 |
| Average film thickness of carbonaceous film (nm) | 1.4 | 3.7 | 8.3 | 18.5 | 0.9 | 2.4 | 4.4 | 4.4 | 1.1 | 1.0 | 1.3 | 1.9 |
| Average particle diameter (µm) | 21 | 23 | 22 | 24 | 21 | 23 | 25 | 31 | 18 | 22 | 24 | 15 |

TABLE 1-continued

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Powder resistance value ($\Omega \cdot cm$) | 140 | 50 | 212 | 231 | 120 | 28 | 15 | 8 | 241 | 154 | 163 | 151 |
| Powder resistance/ amount of carbon in electrode material | 175 | 45 | 236 | 231 | 200 | 16 | 3 | 2 | 201 | 140 | 109 | 69 |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Coating proportion (%) | 73 | 67 | 89 | 91 | 94 | 93 | 95 |
| Apparent density ($\rho V$) ($g/cm^3$) | 0.07 | 0.08 | 0.09 | 1.10 | 1.30 | 1.40 | 1.80 |
| True density ($\rho T$) ($g/cm^3$) | 2.11 | 2.54 | 2.81 | 1.66 | 2.02 | 2.24 | 2.51 |
| $\rho V/\rho T$ | 0.03 | 0.03 | 0.03 | 0.66 | 0.64 | 0.63 | 0.72 |
| Amount of carbon in electrode material (% by mass) | 0.5 | 0.6 | 1.2 | 1.3 | 2.2 | 5.5 | 6.8 |
| Amount of carbon in carbonaceous film (% by mass) | 92 | 94 | 96 | 55 | 84 | 94 | 94 |
| Specific surface area ($m^2/g$) | 9.75 | 6.34 | 5.12 | 10.92 | 10.58 | 7.25 | 6.78 |
| Average film thickness of carbonaceous film (nm) | 7.3 | 11.8 | 26.0 | 1.1 | 1.6 | 5.4 | 5.6 |
| Average particle diameter ($\mu m$) | 21 | 25 | 18 | 24 | 15 | 17 | 20 |
| Powder resistance value ($\Omega \cdot cm$) | 1034 | 847 | 241 | 1450 | 5 | 0.1 | 0.1 |
| Powder resistance/amount of carbon in electrode material | 2068 | 1412 | 201 | 1115 | 2 | 0.02 | 0.01 |

As is clear from Tables 1 and 2, it is found that, in the electrode materials of Examples 1 to 12, compared with the electrode materials of Comparative Examples 1 to 7, the internal resistances were small and it was possible to decrease the internal resistances when the electrode materials were used as an electrode material for lithium ion batteries.

INDUSTRIAL APPLICABILITY

The present invention is available for electrode materials used as positive electrode materials for batteries, and furthermore, positive electrode materials for lithium ion batteries, electrodes including the electrode material, and lithium ion batteries including a positive electrode made of the electrode.

DESCRIPTION OF REFERENCE NUMERALS AND SIGNS

1: ELECTRODE ACTIVE MATERIAL PARTICLES
2: CARBONACEOUS FILM
3: LITHIUM ION

What is claimed is:

1. An electrode material, comprising:

electrode active material particles and a carbonaceous film provided on surfaces of the electrode active material particles, wherein the electrode active material particles having the carbonaceous film provided thereon form an electrode material having a particulate shape;

wherein a proportion of the surfaces of the electrode active material particles coated by the carbonaceous film is 80% or more; and wherein an apparent density $\rho V$ of the carbonaceous film is in a range of 0.10 $g/cm^3$ to 1.08 $g/cm^3$, wherein the apparent density $\rho V$ of the carbonaceous film is calculated from an amount of carbon in the electrode material, a specific surface area of the electrode material, an average film thickness of the carbonaceous film, a proportion of a carbon component in a total mass of the electrode material is in a range of 0.6% by mass to 5.0% by mass, a true density $\rho T$ if the carbonaceous film obtained using a gas-phase substitution method is in a range of 1.80 $g/cm^3$ to 2.50 $g/cm^3$, and a ratio $\rho V/\rho T$ of the apparent density $\rho V$ of the carbonaceous file to the true density of the carbonaceous film is in a range of 0.04 to 0.60.

2. The electrode material according to claim 1,
wherein the proportion of the carbon component in a total mass of the carbonaceous film is 50% by mass or more.

3. The electrode material according to claim 1,
wherein the electrode active material particles include as a main component one selected from a group of lithium cobaltate, lithium nickelate, lithium manganate, lithium titanate, and $Li_xA_yD_zPO_4$, where A represents one or more selected from the group consisting of Co, Mn, Ni, Fe, Cu, and Cr, D represents one or more selected from the group consisting of Mg, Ca, S, Sr, Ba, Ti, Zn, B, Al, Ga, In, Si, Ge, Sc, Y, and rare earth elements, $0<x<2$, $0<y<1.5$, and $0<z<1.5$.

4. The electrode material according to claim 1,
wherein an average particle diameter of the electrode active material particles is in a range of 10 nm to 20,000 nm.

5. The electrode material according to claim 1,
wherein the electrode active material particles have a spherical shape.

6. The electrode material according to claim 1,
wherein the electrode active material particles having the carbonaceous film provided thereon form an agglomerate in a state in which the electrode active material particles having the carbonaceous film provided thereon agglomerate together in a point contact state.

7. The electrode material according to claim 6,
wherein an average particle diameter of the agglomerate is in a range of 0.5 μm to 100.0 μm.

8. The electrode material according to claim 6,
wherein a volume density of the agglomerate is in a range of 50% by volume to 80% by volume of a volume density of a solid agglomerate having no space therein and the density of which is equal to a theoretical density of the electrode active material.

9. The electrode material according to claim 6,
wherein a volume density of the agglomerate is in a range of 55% by volume to 75% by volume of a volume density of a solid agglomerate having no space therein and the density of which is equal to a theoretical density of the electrode active material.

10. The electrode material according to claim 6,
wherein a volume density of the agglomerate is in a range of 60% by volume to 75% by volume of a volume density of a solid agglomerate having no space therein and the density of which is equal to a theoretical density of the electrode active material.

11. The electrode material according to claim 1,
wherein the proportion of the surfaces of the electrode active material particles coated by the carbonaceous film is 85% or more.

12. The electrode material according to claim 1,
wherein the proportion of the surfaces of the electrode active material particles coated by the carbonaceous film is 90% or more.

13. The electrode material according to claim 1,
wherein the apparent density ρV of the carbonaceous film is in a range of 0.15 g/cm$^3$ to 0.80 g/cm$^3$, wherein the apparent density ρV of the carbonaceous film is calculated from an amount of carbon in the electrode material, a specific surface area of the electrode material, and an average film thickness of the carbonaceous film.

14. The electrode material according to claim 1,
wherein the apparent density ρV of the carbonaceous film is in a range of 0.20 g/cm$^3$ to 0.60 g/cm$^3$, wherein the apparent density ρV of the carbonaceous film is calculated from an amount of carbon in the electrode material, a specific surface area of the electrode material, and an average film thickness of the carbonaceous film.

15. The electrode material according to claim 1,
wherein a proportion of a carbon component in a total mass of the electrode material is in a range of 0.7% by mass to 4.0% by mass, a true density ρT of the carbonaceous film obtained using a gas-phase substitution method is in a range of 1.85 g/cm$^3$ to 2.35 g/cm$^3$, and a ratio ρV/ρT of the apparent density ρV of the carbonaceous film to the true density of the carbonaceous film is in a range of 0.08 to 0.50.

16. The electrode material according to claim 1,
wherein a proportion of a carbon component in a total mass of the electrode material is in a range of 0.8% by mass to 2.5% by mass, a true density ρT of the carbonaceous film obtained using a gas-phase substitution method is in a range of 1.90 g/cm$^3$ to 2.20 g/cm$^3$, and a ratio ρV/ρT of the apparent density ρV of the carbonaceous film to the true density of the carbonaceous film is in a range of 0.12 to 0.40.

17. The electrode material according to claim 1,
wherein an average film thickness of the carbonaceous film is in a range of 0.5 nm to 20 nm.

18. A paste for electrodes comprising:
the electrode material according to claim 1; and
a binding agent.

19. A lithium ion battery comprising:
a positive electrode current collector having an electrode material layer formed of the paste for electrodes according to claim 18 on a metal foil.

* * * * *